United States Patent
Benn et al.

(10) Patent No.: US 6,261,460 B1
(45) Date of Patent: Jul. 17, 2001

(54) METHOD FOR REMOVING CONTAMINANTS FROM WATER WITH THE ADDITION OF OIL DROPLETS

(76) Inventors: James A. Benn, 29 Academy St., Arlington, MA (US) 02476; Kenneth C. Thode, 3 Cushing Rd., Scituate, MA (US) 02066

( * ) Notice: Subject to any disclaimer, the term of this patent is extended or adjusted under 35 U.S.C. 154(b) by 0 days.

(21) Appl. No.: 09/274,837

(22) Filed: Mar. 23, 1999

(51) Int. Cl.$^7$ .................................................. C02F 1/54
(52) U.S. Cl. .................. 210/705; 210/727; 210/729; 210/714; 210/730; 210/908; 210/917
(58) Field of Search .................................. 210/704, 705, 210/714, 725, 708, 727, 728, 729, 734, 908, 917, 730

(56) References Cited

U.S. PATENT DOCUMENTS

| | | | |
|---|---|---|---|
| 2,725,985 | * 12/1955 | Howard et al. | 210/705 |
| 3,158,570 | * 11/1964 | Duke | 210/44 |
| 3,203,968 | * 8/1965 | Sebba | 210/429.1 |
| 3,446,732 | * 5/1969 | Gasser et al. | 210/708 |
| 3,676,357 | 7/1972 | Ciuti et al. | 252/259.5 |
| 3,884,803 | * 5/1975 | Traylor | 210/44 |
| 3,965,001 | * 6/1976 | Irani et al. | 210/28 |
| 3,986,954 | 10/1976 | George et al. | 210/44 |
| 4,139,481 | 2/1979 | Wang et al. | 252/61 |
| 4,309,282 | 1/1982 | Smith, Jr. et al. | 209/166 |
| 4,337,149 | 6/1982 | Escalera | 209/166 |
| 4,340,467 | 7/1982 | Wang et al. | 209/166 |
| 4,354,941 | * 10/1982 | Ronge | 210/706 |
| 4,385,995 | 5/1983 | Dondelewski | 210/705 |
| 4,426,282 | 1/1984 | Aunsholt | 209/167 |
| 4,436,624 | 3/1984 | Kreuzburg et al. | 210/632 |
| 4,456,528 | 6/1984 | Akimoto et al. | 209/49 |
| 4,483,742 | 11/1984 | Bridle | 162/5 |
| 4,555,345 | 11/1985 | Yoshida | 210/705 |
| 4,572,786 | 2/1986 | Endo | 210/188 |
| 4,720,329 | 1/1988 | Nagaraj et al. | 209/167 |
| 4,744,903 | 5/1988 | McAninch et al. | 210/632 |
| 4,752,399 | 6/1988 | Viator et al. | 210/704 |
| 4,762,526 | 8/1988 | Funaji et al. | 44/627 |
| 4,772,382 | 9/1988 | Bulatovic | 209/166 |
| 4,790,943 | 12/1988 | Dunn et al. | 210/705 |
| 4,839,054 | * 6/1989 | Ruebush et al. | 210/639 |
| 4,851,036 | 7/1989 | Anthes et al. | 75/2 |
| 4,859,318 | 8/1989 | Brookes et al. | 209/166 |
| 4,898,721 | 2/1990 | Alway | 423/240 |
| 5,078,899 | * 1/1992 | Garrison | 210/704 |
| 5,130,358 | * 7/1992 | Danner | 524/140 |
| 5,154,834 | * 10/1992 | Van de Venter | 210/666 |
| 5,223,147 | 6/1993 | Rosenstock et al. | 210/705 |
| 5,306,422 | 4/1994 | Krofta | 210/151 |
| 5,340,467 | 8/1994 | Gregoli et al. | 208/390 |
| 5,378,369 | 1/1995 | Rose et al. | 210/637 |
| 5,395,535 | 3/1995 | Pinckard | 210/691 |
| 5,441,156 | 8/1995 | Fabry et al. | 209/166 |
| 5,443,158 | 8/1995 | McKenny et al. | 209/166 |
| 5,456,363 | 10/1995 | Groppo et al. | 209/166 |
| 5,514,282 | 5/1996 | Hibbard et al. | 210/652 |
| 5,518,581 | 5/1996 | Miyagoshi et al. | 162/5 |
| 5,543,050 | 8/1996 | Roshanravan | 210/605 |
| 5,543,056 | 8/1996 | Murcott et al. | 210/705 |
| 5,545,330 | 8/1996 | Ehrlich | 210/703 |
| 5,635,075 | 6/1997 | Boyd et al. | 210/747 |
| 5,637,221 | 6/1997 | Coyne | 210/608 |

* cited by examiner

*Primary Examiner*—Peter A. Hruskoci
(74) *Attorney, Agent, or Firm*—Mintz, Levin, Cohn, Ferris, Glovsky and Popeo, P.C.

(57) ABSTRACT

A method for removing a contaminant from water includes mixing droplets of a substantially non-water soluble oil with water to combine with the contaminant. The oil can include polar or ionic functional groups. A chemical destabilizer is added to the water to coagulate and aggregate the oil-contaminant mixture. The mixture is then separated from the water by gravity settling, filtration, or dissolved air flotation, thereby removing the contaminant.

30 Claims, No Drawings

METHOD FOR REMOVING CONTAMINANTS FROM WATER WITH THE ADDITION OF OIL DROPLETS

BACKGROUND OF THE INVENTION

There is an increased need to reduce levels of organic contaminants in treated industrial wastewater and drinking water. Increased need for treatment of industrial wastewater discharge is the result of the National Pollution Discharge Elimination System (NPDES) which was established as a result of the Clean Water Act of 1972. NPDES controls discharges from point sources of water pollution, and focuses its efforts on monitoring, enforcing and permitting industries that produce waste water. Two organic contaminant classes regulated by NPDES are contaminants leading to biochemical oxygen demand (BOD), and fats, oils and greases (FOG). Both classes of contaminants can be toxic to humans and the environment, and interfere with biologic water treatment systems. Examples of sources of FOG and BOD are petroleum and chemical manufacturing, metal-finishing, food processing, paper-making and textiles.

Additionally, new rules proposed by the Environmental Protection Agency, under the Safe Drinking Water Act, can lead to increased monitoring and regulation of trace organic contaminants in drinking water. Drinking-water purification plants throughout the United States and Europe utilize chlorine as a primary means of disinfection. However, the chlorine reacts with organic contaminants to produce small but significant amounts of compounds such as methylene chloride, methyl chloride, methyl bromide, bromoform, and dichlorobromomethane, collectively called trihalomethanes (THMs). Most THMs are carcenogenic and their concentrations in municipal drinking waters must be closely monitored.

Other organic contaminants in drinking water may be toxic to living organisms, or impart unwanted characteristics to water like taste, odor, color or turbidity. In addition, contaminants may be biologically active pathogenic microorganisms, such as Giardia cysts and Cryptosporidium. Sources of contaminants can be, for example, petroleum from rainwater run-off or leaf-debris or other natural decaying organic matter.

Organic contaminants of this type are generally in the size ranges of about $10^{-7}$ to $10^{-2}$ cm in diameter and are too small to be removed by physical filtration. They also resist settling out by gravity. They can include a wide range of organic debris with different molecular weights, and abilities to form dispersion, polar, hydrogen bonding or other intermolecular interactions. Some can dissolve in water completely, others can show partial solubilities due to these polar or hydrogen interactions. In addition, there can also be significant amounts of surface-active molecular debris that contain hydrophobic and hydrophilic components. This debris tends to absorb onto other contaminants and impart to them slight but significant polar characteristics, promoting formation of meta-stable colloidal suspensions.

The most economical treatment method for removing these contaminants from drinking and waste water is typically chemical destabilization followed by gravity settling, filtration or dissolved air flotation. Because destabilization chemistry depends on the interactions between polar functional groups contained on the contaminants to achieve coagulation and flocculation, those that do not carry polar groups are not appreciably removed by this chemistry. Additionally, destabilization chemistry can only remove contaminants that are not dissolved in water. These two factors leave the majority of BOD, FOG, and organic contaminants currently outside of the reach of this treatment method.

SUMMARY OF THE INVENTION

This invention is a method for treating drinking water and industrial waste water using small hydrophobic oil droplets that provides an alternative and improved means for removing dissolved and particulate contaminants in water treatment systems where chemical destabilization is part of the treatment protocol. Additionally this invention enhances the removal of contaminants from water when using dissolved air flotation (DAF).

The method includes adding droplets of a substantially non-water soluble oil to contaminated water to form a mixture and to combine with the contaminant. A chemical destabilizer is added to the water to further form a mixture to aggregate the oil droplets. The oil droplets are then separated from the water, thereby removing the contaminant.

In another embodiment of the method, a substantially non-water soluble oil is added to water having a contaminant. A destabilizer is added to the water. The oil, water, contaminant and destabilizer are mixed to form small oil droplets in the water, wherein the oil droplets combine with the contaminant. The oil droplets are separated from the water, thereby removing the contaminant.

A substantially non-water soluble oil is selected, such as an aliphatic oil, that has a low solubility in water and a high affinity for the contaminants, so that it combines with them, making them effectively insoluble in water. The oil is also selected so that it can attain a higher affinity for the contaminants when broken into small droplets or formed into colloidal structures within the water phase. The oil is also selected so that the oil-contaminant mixture can be substantially coagulated and aggregated by use of chemical destabilization. The oil is further selected so that it coats particulate or droplet contaminants, giving these contaminants the ability to be substantially coagulated and aggregated by use of coagulation chemistry. The oil is also selected so that after chemical destabilization, the oil-contaminant mixture can be removed by gravity settling, filtration or DAF. The oil is further selected so that it coats particulate or droplet contaminants, making their surface more hydrophobic thus making them more susceptible to air bubbles attaching to them thus enhancing their removal by DAF. The oil can be derived from petroleum sources or from natural sources such as, for example, soy beans, coconuts or rapeseeds.

In a preferred embodiment, the oil used is a $C_{16-18}$ Ester derived from a natural source. The quantity of oil added to the water is about the same as or less than the quantity of contaminant in the water. The oil and water mixture is agitated or stirred sufficiently to cause the oil to break into droplets that are less than about 0.1 millimeter in diameter. The water is then treated with, for example, aluminum sulfate to coagulate the oil-contaminant mixture, and, for example, a flocculant, such as Magnifloc to aggregate the mixture. This mixture is then removed from the water by use of DAF, effectively removing the contaminants from the water.

DETAILED DESCRIPTION OF THE INVENTION

While this invention has been particularly shown and described with references to preferred embodiments thereof, it will be understood by those skilled in the art that various changes in form and details may be made therein without departing from the spirit and scope of the invention as defined by the appended claims. All percentages and parts are by weight unless otherwise indicated.

An objective of water treatment is to remove contaminants from water so that it is biologically and chemically safe for its intended use. Water intended for drinking must, of course, be purified to a much greater extent than wastewater that is to be discharged to the environment. However, even this water must be purified to the extent that the remaining contaminants are not toxic to the environment.

When chemical destabilization is used to purify water, contaminants that are either dissolved in the water or that do not carry polar functional groups or that have hydrophilic surfaces are not appreciably removed. It is the purpose of this invention to extend the capability of chemical destabilization to remove these contaminants. These capabilities are realized by adding oil to the water that is easily removed by destabilization. The oil is selected to combine with or capture the contaminants and therefore impart to the contaminants those physical quantities that allows them to be removed by use of chemical destabilization. Therefore, dissolved contaminants, after combination with the oil, become water-insoluble, the surfaces of particles or droplets of contaminants in combination with the oil acquire attributes of polar functional groups, and also become sufficiently hydrophobic so that air bubbles readily attach to them, allowing their removal by DAF or other suitable means.

Mechanisms for the Oil to Combine with or Capture Contaminants Solvent Extraction Mechanism A feature of this invention is that an oil is added to the contaminated water that is substantially insoluble in the water. One purpose of the oil addition is to combine with a dissolved organic contaminant to make the contaminant become insoluble. In order for this to take place, the contaminant must have a higher solubility or affinity for the oil than it does for water. Organic compounds dissolve into water because the affinity of their polar functional groups for water is stronger than the repulsion of their non-polar groups from water. It is also known that increasingly longer carbon chain molecules are increasingly more insoluble in water. It has been found in this invention that addition of a small amount of longer-chain oil to water which contains some types of dissolved organic contaminants results in the oil mixing with the contaminants sufficiently to make the contaminants insoluble in water. A possible mechanism is that the longer chain oils co-dissolve with the dissolved contaminants, giving their non-polar portions sufficient repulsion for water to overcome the strength of their hydrophilic groups. If insufficient oil is added or if the oil does not contain sufficient hydrophobic groups, the contaminant can instead make the oil become soluble in water after combination with it.

Droplet Formation Mechanism Surface Area Mechanism

Another feature of this invention is the ability to break the oils into sufficiently small droplets in order to increase the affinity of the oil for contaminants. Droplets can be generated through, for example, gentle agitation of the oil-water mixture. The oil formed into small droplets provides a large area of interface surface between the contaminated water and oil, and also provides the opportunity for a substantial majority of the oil molecules to come into close proximity and combine with the contaminants. Organic contaminants that have some combination of hydrophilic and hydrophobic areas of their molecular structure can be held along this surface because they are in a lower overall energy state residing at a water/oil interface rather than in the bulk water or oil. The smaller the oil droplets, the more surface area is generated, providing for an increased carrying capacity for contaminants.

Polar Zone Mechanism

When the oil droplets are sufficiently small and contain polar (hydrophilic) functional groups, it is believed that the oil molecules come to be oriented so that their polar groups are closer to surface of the droplet, and their hydrophobic groups are closer to the less hydrophilic center of the droplet. In droplets that are not more than several molecule widths in diameter, the hydrophobic groups or tails of the oil molecules may mix together to form a purely hydrophobic droplet center while the polar groups form an outer polar shell around the droplet.

This molecular orientation may have a stronger capability for combining with the organic contaminants than oils with no polar groups because zones of varying polarity are available to compete with the polar groups in water for forming more stable, lower energy polar associations with the contaminants. These varying polar zones are also available to hold contaminants with different ratios of polarity to aliphatic structure. For example, the inner hydrophobic core may hold non-polar aliphatic hydrocarbons. Semi-polar compounds, such as alcohols and amines, may be held near the outside edge of the droplets, and aromatic hydrocarbons, such as benzene and toluene, that are strongly hydrophobic yet have strong polar sites may be held at both the surface and in the center of the droplet.

Polar portions can consist of a hydrophilic chemical group or combinations thereof. Examples of suitable groups are alcohols, glycerides, sterols, esters, ethers, aldehydes, ketones, carboxylates, sulfates, and sulfonates. Polar groups may be either non-ionic, anionic, cationic, or carry both charges, in which case they are called amphoteric.

A preferred oil containing polar groups is one that has a carbon chain as long as possible yet remains liquid, and that has polar groups that are as strong as possible without causing the oil to dissolve in water. More specifically, a preferred oil would be one with a carbon chain of over 10 carbon atoms which contains ester functional groups.

Ionic Mechanism

Another mechanism proposed for making oils combine with contaminants is to use oils with polar ionic functional groups of the opposite charge than the contaminants. Organic contaminants that would normally co-dissolve with oils would be expected to be rejected by these oils if each had strong ionic groups of the same charge. Some level of co-dissolving would be expected to take place if the oil had no ionic charge. However, where the oil and contaminant have ionic groups that were of the opposite charge, the polar ionic groups are expected to form strong associations with each other, effectively competing with polar groups in water, and thus enhance the preferential combination of the contaminant with the oil.

While experiments were not performed using oil droplets that contained polar ionic groups, it is expected that these droplets will attract ionic contaminants of the opposite charge based on experiments reported in the literature. For example, in the paper, Antonio Lopes et aL, "Multiequilibria of 2-(2-Furanyl)-1H-benzimidazole Neutral and Protonated Forms in the Presence of Amphiphillic Aggregates", *Environ. Sci. Technol* 26, 2448–2453 (1992), the teachings of which are incorporated herein by reference, the solubility of a contaminant containing cationic functional groups in an anionic microdispersed organic media is much higher than the solubility of the same contaminant with no cationic functional groups. The microdispersed organic media consisted of an ionic surfactant, sodium dodecyl sulfate, which is soluble in water but forms micellular structures when sufficient surfactant is added to the water.

Retaining and Removing the Droplet Structure

Another aspect to this invention is the ability to provide the oil with sufficiently strong polar groups to allow stabilization of small droplets and capture of contaminants, but not so strong as to prevent removal of the oil by use of chemical destabilization. These two requirements are generally in conflict. If aliphatic oils are agitated in water, the small droplets that are formed will quickly coalesce back into large droplets and finally to a separate single phase. Addition of water-soluble surfactants, such as those used in soaps allows stabilization of these small droplets and possibly capture of contaminants. However, chemical destabilization has been found to be ineffective at separating these mixtures from water.

Surprisingly, it has been found that use of non-water-soluble surfactants allows stabilization of small droplets, capture of contaminants, and removal of the oil and contaminants by use of chemical destabilization. To achieve this effect, either the oil itself can have functional polar groups, or a non-water soluble surfactant can be dissolved into the oil to give the mixture polar properties.

Surfactants can be classified by their hydrophile-lipophile balance (HLB), which refers to the relative strengths of their hydrophilic and hydrophobic parts. HLB values range from 1 to 40. Surfactants with HLB values in the 1 to 4 range are very insoluble in water. Surfactants with HLB values in the 5 to 7 range are more soluble in water. When these surfactants are added to water, they do not disperse, but remain a separate phase. Gentle agitation usually transforms the surfactant into a metastable mixture of droplets. Surfactants with HLB values above 10 generally spontaneously dissolve in water. Surfactants used to emulsify water in oil have HLB ranges from 1 to 6; those used to emulsify oil in water have HLB values from 8 to 18. Soaps and detergents generally have HLB values from 13 to 15.

Low HLB surfactants are essentially non-water-soluble oils that contain polar groups. These oils can be used as is for contaminant removal from water according to the method taught in the invention. Surfactants can also be mixed with oils to give them increased polar groups resulting in an increased capability to combine with contaminants, and to promote the capability to form semi-stable suspensions of small droplets in water. However, the resulting surfactant-oil-contaminant mixture must be substantially less water soluble than the contaminants targeted for removal, and the droplets, emulsions or colloidal suspensions formed by this mixture must be removable to a substantially greater extent by chemical destabilization than the contaminant alone.

As a guide for retaining the utility of an oil-surfactant mixture to remove contaminants from water, the HLB value of the mixture should be less than about 10, and preferably less than 6. As a guide for predicting the resulting HLB values of mixtures, the effect on HLB values of mixing oils and surfactants is generally additive. For example, a first surfactant having an HLB value of one and a second surfactant of equal amount having an HLB value of 10 would result in a mixture having an HLB value of 5.5. This guideline can be used to predict the proper dosages of oil and surfactant to use to produce a mixture with the desired HLB value. This guideline also suggests that for removal of organic contaminants that have a high solubility in water, an oil with a lower HLB value should be used. This promotes a sufficiently low enough HLB value of the overall surfactant-oil-contaminant mixture to be successfully removed by destabilization chemistry.

An example of a commercially-available group of surfactants is the following. The Triton "X-" products, from Union Carbide are alkylaryl polyether alcohols, and can be purchased with varying lengths of polyoxyethylene chains. The "X" values represent the average number of ethylene oxide units. The higher the X number, the higher the HLB value and the more soluble the compounds are in water. Triton X-15 has an HLB value of 3.6, and is insoluble in water. Triton X-45 has an HLB value of 10.4 and is borderline in oil or water solubility. Triton X-114 has an HLB value of 12.4, and is soluble in water at room temperature.

In experimental results reported in this invention, oil consisting of substantially C16 to C18 aliphatic chains containing methyl ester polar groups was used to demonstrate removal of contaminants from water. The methyl ester has an HLB value of approximately one, and a water solubility of about one part per billion (ppb). While experimental results presented herein are based on this single surfactant, it is expected that most low HLB surfactants will work with a similar mechanism, and different surfactant groups with different polar and ionic functional groups will be found to work better for different classes of contaminants.

Use of Chemical Destabilization to Remove the Combined Oil-Contaminant Colloidal Suspensions from Water Chemical destabilization as practiced in this invention is the adding of chemistry to water to allow the oil-contaminant particles to agglomerate into larger groups that can be removed by standard physical means. Destabilization is generally a two-step process consisting of first coagulation then flocculation. Each step requires separate chemical additives, and both can often be enhanced by the use of additional chemistries referred to as coagulant or flocculant aids. Once destabilization has taken place, the contaminants can be removed by physical means, such as sedimentation, filtration, or DAF.

Definition of Coagulation

Coagulation uses the addition of water-soluble salts to the water to overcome repulsive forces between colloidal particles. These salts are often multi-valent metal cations that disassociate in water and are either adsorbed directly onto the surface of the colloidal particles or which coordinate around them in diffuse electrical layers. The purpose of these counter ions is to directly reduce the surface charge or polar strength of the colloidal particles, thus reducing the repulsive forces between them. This allows coalescing or agglomeration of the particles into larger structures, which can then be more easily removed by physical means. In this invention, it has been found that these salts can be used to destabilize suspensions of oil droplets and their associated contaminants, effectively capturing the contaminants in the agglomerated oil mixtures.

Examples of inorganic chemicals used for coagulation are the polyvalent cations of aluminum and iron, and calcium hydroxide. Many natural coagulants, such as starch, cellulose, chitosan, polysaccharide gums, and proteinaceous materials also act as coagulants. Examples of inorganic coagulants include the following: liquid aluminum sulfate, $(Al_2(SO_4)xH_2O)$ and liquid sodium aluminate, $(Na_2Al_2O_4 \times 2H_2O)$ both available from Holland Chemical, Adarns, Mass. Another inorganic coagulant is liquid Ferric Chloride $(FeCl_3 \times H_2O)$ available from Aldrich Inc., Milwaukee, Wis. Amounts in the range of 1 to 10 milligrams of coagulant per liter of water or parts per million (ppm) are generally sufficient to cause coagulation, but the exact dosage for a given water sample must be determined by laboratory testing.

Definition of Flocculation

Particles agglomerated by coagulation chemistry alone can produce weak aggregates that are easily upset during attempts at their physical removal from the water. Therefore, flocculants are used to mechanically bring together the coagulated particles, and enmesh them in a matrix sufficiently strong to withstand the contaminant removal process.

Flocculants are large, high-molecular weight water-soluble polymers containing many polar groups, such as polyacrylamide. The polymers react with the particles by attaching to ionic or polar adsorption sites found on them. A bridge is formed when two or more particles become adsorbed along the length of the polymer. Bridged particles become intertwined with other bridged particles during the flocculation process. The size of the three-dimensional particle grows and water is moved out of the structure. These polymers can also serve to lower the charge or polar strength of coagulant particles, thus further facilitating the coagulation-flocculation process.

After the flocculant is added to water, the water must be physically agitated in some way to bring together the coagulated particles to form the larger agglomerated particles. This can be accomplished by simple stirring, or by bubbling air through the water.

Examples of polymer flocculants include Magnifloc 496C, Magnifloc 1555C, Magnifloc 1839A, Magnifloc 835A, Percol LT 22S, Percol LT 20, and Betz 713. The Magnifloc products are available from Cytech Chemical, Wayne, N.J., the Percol products from Allied Colloids, Suffolk, Va., and Betz 713 product from Betz Paperchem, Inc., Rindge, N.H. Dosages of flocculants in the range of one to ten ppm are generally sufficient, but the exact dosage for a given water sample must be determined by laboratory testing.

Definition of Destabilization Aids

It has also been found that both coagulation and flocculation of droplets and their associated contaminants can often be enhanced by the use of chemistries referred to as coagulant aids or flocculant aids. These chemistries can act as coagulants or flocculants themselves, but in combination with the primary coagulants and flocculants, a stronger and more robust removal of contaminants is realized.

An example of a coagulant aid is Bentonite clay, which is a hydrated aluminum silicate having the generalized formula $Al_2O_3SiO_2-XH_2O$. This is available under the trade name Altafloc from Closed Systems, Inc., Trussville, Ala. Other types of coagulant aids include Kaolinite Clay available from Kaopolite Inc, Union, N.J.; Montmorillonite Clay available from Nalco Chemical, Naperville, Ill.; Carboxymethylcellulose available from Closed Systems, Inc.; Activated Silica available from Aldrich Inc., Milwaukee, Wis.; and Activated Bentonite available from Allied Colloids Inc., Fairfield, N.J. Clay dosages in the range of 10 to 50 ppm are generally sufficient, but the exact dosage for a given water sample must be determined by laboratory testing.

Use of Flotation to Remove Coagulated Contaminants

Dissolved Air Flotation (DAF) as practiced in this invention is the introduction of water with a high concentration of dissolved, air into the bottom of a column of the water and oil-contaminant suspension. The air is released from the water causing small air bubbles to be formed. The air bubbles as they rise up are attracted to and attach to the surfaces of the oil droplets, thus making them buoyant, and lifting them to the surface of the water column for removal by, for example, skimming.

Advantages of Contaminant Removal by this Invention

An advantage of the present method is that it can be used with existing water treatment systems where the capability of the system to remove organic contaminants is dramatically increased at the cost of only adding the additional chemistry. As an example, in potable water treatment in many facilities, alum or other conventional coagulants are added to reduce color and trace organic contaminants before chlorinating to reduce levels of trihalomethanes. Carbon bed filters are often used downstream to remove additional organic contaminants. Use of a non-water soluble aliphatic oil with polar groups, as taught by this invention, can remove substantially all color and turbidity, and also can provide a more effective and less expensive approach than carbon beds to remove organic contaminants that lead to THM's. The oil is added to the water in an initial treatment step, where it combines with the trace organics. The oil, water and contaminant are subjected to a destabilizer. The destabilizer can include a flocculant, coagulant or coagulant aid, where it combines with other coagulated contaminants in a hydrophobic phase. In one embodiment, the oil can be added to the water first and then the destabilizer can be added. Alternatively, the destabilizer can be added to the water first and then the oil can be added. In another embodiment, the oil and the destabilizer can be mixed with one another and then added to the water. All methods result in a hydrophobic phase forming in the water. The hydrophobic phase is separated from the water, such as by sedimentation or a downstream sand bed or other filtration media to remove the contaminants.

While not tested, it is believed that biologically active pathogenic material, which is organic in nature, may also be removed by the methods taught in this invention. Biologic contaminants may include for example bacterial, viral, DNA, and RNA material. Bacterial and viral particles are not considered dissolved in water, however because of their small size (10 microns and below) and high water content, they easily remain suspended in water, do not settle out with gravity and cannot be easily removed by physical filtration. DNA and RNA fragments can be as small as 20 nucleotides in length and still contain biologically active gene sites. These particles carry hydrophilic phosphate ester functional groups, which render them soluble in water. Adding oxidants to water like chlorine, permanagante or ozone can inactivate most of these biologic contaminants, however some, like Giardia cysts and Cryptosporidum can withstand exposure to these oxidants and still retain pathogenic activity.

As these contaminants are substantially made up of long-chain hydrocarbon molecules, it is expected that they can be removed from water using the methods taught in this invention. Oils with or without functional polar groups would be added to water to combine with these types of contaminants, making them less soluble in water, more susceptible to being captured and agglomerated by destabilization chemistry, and removable from water by DAF.

Use of the Partition Coefficient for Measuring the Efficiency of the Contaminant Removal Process.

In a traditional solvent-extraction process, the efficiency of removal of a solute from one solvent to another solvent is related only to its solubility in the two solvents. If the solubility is the same in both solvents, equal volumes of solvents will hold equal volumes of solute. If the solubility of the solute is ten times higher in the first solvent, then that solvent can hold ten times the solute as an equal volume of the second solvent, when both solvents are mixed together.

A useful measure for the efficiency of contaminant removal by solvent extraction is the Partition Coefficient. This coefficient is defined as the ratio of the solubilities of the solute in the first and second solvents of interest, and is a physical constant for a given pressure and temperature.

The larger the value of the partition coefficient, the less volume of the first solvent is needed to extract solute from the second solvent. Thus the partition coefficient is a strong indicator of the efficiency at which a solvent extraction process can be performed.

This same concept can be used to evaluate the efficiency of contaminant removal in this invention. The volume of contaminant that is removed by the treatment process is divided by the volume of contaminant remaining in the water after treatment. This ratio multiplied by the ratio of water volume to oil volume gives an apparent partition coefficient or ratio of the apparent solubility of the contaminant in the oil to the apparent solubility of the contaminant in the water. This coefficient is not a physical constant and for a given oil will vary not only with temperature and pressure, but will also vary with oil droplet size, destabilization chemistry, and parameters of the DAF process. It can, however, be used to compare types of oils and chemistry schemes for their contaminant removal efficiency. Also it can be used to compare the contaminant removal process described in this invention with traditional solvent extraction efficiencies.

EXPERIMENTAL RESULTS

A series of qualitative screening tests were performed on a selection of non-soluble oils of varying HLB values and polar functional groups for their abilities to remove organic contaminants from water. Examples of oils tested are C6 to C24 fatty acids, unsplit fats and oils, mono-, di- and triglycerides, sterols and phenolic organic compounds. All these oils were found to preferentially combine with organic contaminants in water. Additionally, it was shown that these oils and their associated contaminants could be removed by use of destabilization chemistry.

Then a C16 to C18 carbon chain length oil containing ester polar groups (methyl ester) was tested for its capability to remove organic contaminants from a wide range of natural and industrial wastewater sources. Some of the results of these experiments are reported here.

Three protocols were used in this testing, which are given below. The first details how the ester was added, or spiked into the contaminated water. The second details the coagulation and flocculation procedures. The third details the procedure used for Dissolved Air Flotation of the oil and contaminants out of the water.

Spiking Procedure

All oils were spiked neat (no dilutions prior to administration). A standard spiking process was performed as follows:

1. 20 mls of test water sample was transferred into a 100 ml disposable aluminum weighing dish.
2. The weighing dish was then transferred to a digital Mettler AC 100 balance (readability 0.1 milligram, (mg)).
3. The oil was then added in a drop-wise fashion using a 1 ml pipette until the desired weight was obtained.
4. The aluminum weighing tin was then removed from the balance and was slowly decanted into a 1,000 ml amber glass container with a threaded cap and seal.
5. The aluminum dish was then rinsed with additional sample to ensure quantitative transfer. All rinses were decanted into the 1,000 ml amber glass container with threaded cap and seal.
6. The amber container was sealed and agitated by gentle shaking (i.e., one shake per second for 90 seconds) or by vigorous shaking (i.e., three shakes per second for 60 seconds), depending on the requirements for a given experimental item.
7. After complete mixing, the sample was immediately utilized for a given procedure. Spiked samples were not stored prior to experimentation.
8. 1,000 ml amber mixing containers were first cleaned with detergent, scrubbed with a tubular cleaning brush, and rinsed six times with hot tap water, then rinsed six times with distilled water and allowed to air dry.
9. After drying each container, cap and seal were rinsed with virgin Freon 113 and allowed to dry. Containers were then visually inspected for any visible signs of dirt or oil droplets. If containers were visually suspect, the cleaning process was then repeated.

Coagulation Procedure (25 ml test level)

1. 25 mls of test sample were decanted into a 75 ml culture tube with a screw cap and Teflon™ seal.
2. A 1% solution (by weight) (using Milli-Q water as the diluent) of given coagulant was then drawn up into a 1 ml calibrated pipette and slowly dosed into the 75 ml culture tube containing the test sample. The culture tube was inverted at a rate of one agitation per second and periodically inspected over a 100 watt light source.
3. A sufficient quantity of coagulant caused the particulate matter within the sample to agglomerate, thereby producing a visible precipitate. An overall improvement in sample clarity was also observed at this point.

Flocculation Procedures (15 ml test level)

1. The coagulated sample was then evaluated for shear resistance by utilizing vigorous shaling. If the precipitate appeared only moderately stable after vigorous agitation the sample was then treated with flocculants to further increase shear resistance.
2. All flocculants were dosed in diluted form. Typically 1.0% solutions (by weight) (using Milli-Q water as the deluent) were utilized for standard bench testing. Flocculants can be extremely viscous materials therefore care was taken to ensure that complete delivery into the testing sample had been accomplished.
3. Flocculant dosages were generally kept within 2–5 ppm dosing range. The overall goal was to add just enough flocculant to the destabilized solution to further agglomerate the destabilized particles.
4. The flocculant was introduced into the 75 ml culture tube which had been previously treated with the predetermined amount of coagulant. The flocculant was dosed into solution via a 1 ml disposable plastic pipette.
5. The sample was then inverted at a rate of once per second until the aggregate participate size was maximized and optimum shear resistance was achieved.

Coagulation and Flocculation Procedures (1,000 ml test level)

1. Having found the proper combination of coagulant/flocculant, the system was now scaled up to the 1,000 ml test level.
2. 1,000 mls of test sample was placed on a Bird-Phipps paddle mixing apparatus with illuminated fluorescent base and was paddle mixed at 100 revolutions per minute (rpm) until all suspended matter was uniformly distributed.
3. Once uniformity had been achieved, the samples mixing velocity was increased to 300 rpm and a dosage of coagulant, as determined in the 25 ml test level, was transferred via a 10 ml plastic pipette to the mixing sample.

4. The mixture was allowed to flash mix at 300 rpm for 60 seconds and the mixing velocity was then reduced to 30 rpm.
5. The sample was now visually inspected for the formation of the precipitate. Once the precipitate had formed, the sample was ready for the addition of the flocculant which was also determined in the 25 ml test level.
6. The mixing velocity of the destabilized sample was then increased to 300 rpm.
7. The flocculant was dispensed into the mixing system via a 1 ml plastic pipette and allowed to flash mix for 5 seconds. After the five second interval had lapsed, the mixing velocity was reduced to 30 rpm and the sample was allowed to react for an additional 25–30 seconds.
8. The optimum precipitate morphology should be virtually identical to that developed in the 25 ml test level. The sample was now ready to be submitted to the dissolved air flotation simulation.

Dissolved Air Flotation Procedures 1. 800 mls of the treated sample was then transferred to a 1,000 ml Nalgene™ graduated cylinder which had been fitted with a ¼ inch barbed end with pinch clamp.
2. The sample was transferred into the graduated cylinder as rapidly as possible. 25% recycle pressurization was achieved by the introduction of 200 mls of aerated water via a brass introduction wand.
3. The recycle water was produced in the following manner: A two-gallon metal pressure canister was filled with 4 liters of Milli-Q water. The canister was then pressurized with compressed atmospheric air to 60 pounds per square inch (psi). The pressure canister was then manually shaken until a pressure drop of 10 psi was obtained. The system was then pressurized once again with compressed air until the pressure once again read 60 psi. The canister was manually shaken a second time until a pressure drop of about 5–10 psi was obtained. The canister discharge hose was then bleed until the resulting discharge was milky white in color. The recycle water was then ready for introduction into the flotation cylinder.
4. The recycle stream was allowed to contact the chemically treated sample for approximately 3–4 minutes.
5. A flotation rate was then determined by observing the distance at which the precipitate traveled in the first minute of flotation. Excellent flotation rates were normally of the order of 10–12 inches the first minute after complete introduction of the recycle stream.
6. After the 4–5 minute contact time had lapsed, the resulting sludge layer volume was measured and approximately 100 mls of subnatent was wasted from the pinch value at the bottom of the cylinder. The first 100 mls of treated sample was wasted to insure that no solids became trapped in the barbed end during the flotation process.
7. The remaining sample was then drawn from the system into clean glass (I-Chem™) storage containers.
8. The following volumes of sample and recycle water constituted 25% and 33% recycle pressurization. 800 mls of chemically treated sample to 200 mls of recycle water equaled 25% recycle pressurization, 750 mls of chemically treated sample to 250 mls of recycle water equaled 33% recycle pressurization.
9. For samples that had been treated by means of "DAF only", it was understood that no chemical treatment steps were completed prior to the DAF simulation.

Analytical Test Procedures

The following laboratory procedures were used to quantify the amount of contaminants present in the water being tested, before and after treatment. Fats, Oil & Grease (FOG) measured in mg/liter, EPA method 413.1 Total Petroleum Hydrocarbons (TPH) measured in mg/liter, EPA method 418.1 Apparent Color, measured in PCU units, EPA method 110.2 Turbidity, measured in NTU units, EPA method 180.1 Trihalomethane Formation Potential (THMFP), measured in mg/liter, EPA method 602.2

Study 1—Removal of Methyl Ester from Distilled Water by Gravity, DAF, and Destabilization Chemistry with DAF In the use of this invention it is important to have the capability to quickly and easily remove the combined oil and contaminant mixture from the water being treated. This step was modeled by testing the ability of gravity, DAF and DAF combined with destabilization chemistry to remove 1,000 ppm of methyl ester from water. FOG measurements were performed on the water samples to determine the levels of methyl ester remaining in the water after treatment.

The results are shown in Table 1. In the first test, 15 minutes of gravity settling removed 65% of the ester from the water. In the second test, DAF alone removed 85% of the ester.

TABLE 1

Comparison of Gravity Settling, DAF, and Destabilization Chemistry with DAF to Remove Methyl Ester from Water.

|  | Gravity 15 min | DAF Only | DAF and Destabilizer |
|---|---|---|---|
| ppm in | 1,000 | 1,000 | 1,000 |
| ppm out | 346 | 152 | 75 |
| % Removal | 65.4% | 85% | 92.5% |

In the third test, DAF in combination with destabilization chemistry removed 92% of the ester within two minutes. The coagulant dosage was fifty ppm of Altafloc, and the flocculant dosage was 2 ppm of Magnifloc 496C.

These results show that a meta-stable colloidal structure was formed by the ester in the water that resisted settling out by gravity. When DAF was applied, much more ester was removed. However, the greatest amount removed was by use of destabilization chemistry which prepared the ester for removal by DAF by agglomerating the ester into droplets large enough to be captured and removed by the DAF process.

Study 2—Removal of Non-Polar Oils and Methyl Ester from Distilled Water by Destabilization Chemistry with DAF This study explored the importance of polar groups in oils for their efficient removal by destabilization and DAF. Several oils made up of aliphatic carbon chains approximately 10 to 20 carbons long were compared to the 16 to 18 aliphatic carbon chain oil containing ester polar groups for removal efficiencies from distilled water. The procedure used was the same as that of Study 1, except that the coagulant was 100 ppm of Altafloc, and the flocculant was 3 ppm of Magnifloc 496C.

These results are disclosed in Table 2. The petroleum, olive oil, and vegetable oil contained no polar groups, and were only partially removed by destabilization. The methyl ester was almost completely removed. These results strongly support the importance of polar groups in the oils for their removal by destabilization chemistry.

TABLE 2

Comparison of Non-Polar Oils and Methyl Ester from
Distilled Water by Destabilization Chemistry with DAF

|  | Methyl Ester | Petroleum Oil | Olive Oil | Vegetable Oil |
|---|---|---|---|---|
| ppm in | 100 | 100 | 100 | 100 |
| ppm out | 6 | 32 | 79 | 77 |
| % removal | 94% | 68% | 21% | 23% |

Study 3—Removal of Oils Combined with a Polar Oil from Potable Water by Destabilization Chemistry with DAF In this study the effects of mixing 1 part of a polar oil with 10 parts of a non-polar oil were studied in order to determine the effect of adding polar functional groups to the oils. The oils, ester, destabilization chemistry type, and dosages were the same as in Study 2. As is shown in Table 3, In every case, there is a dramatic increase in the removal of the oil when ester is mixed with the oil. The water used was raw potable water drawn from the eastern Lenox Mountain reservoir in Lenox, Mass.

TABLE 3

Comparison of Removal of Oils Combined with a Polar Oil
from Potable Water by Destabilization Chemistry with DAF

| Oil Type | Oil initial ppm | Ester ppm | Oil final ppm | Percent Removed |
|---|---|---|---|---|
| Petroleum Oil | 100 | 0 | 55 | 45% |
|  | 100 | 10 | >1 | 99% |
|  | 1,000 | 0 | 234 | 77% |
|  | 1,000 | 100 | >1 | 100% |
| Olive Oil | 100 | 0 | 68 | 43% |
|  | 100 | 10 | 12 | 88% |
|  | 1,000 | 0 | 263 | 74% |
|  | 1,000 | 100 | >1 | 100% |
| Vegetable Oil | 100 | 0 | 67 | 33% |
|  | 100 | 10 | >1 | 99% |
|  | 1,000 | 0 | 148 | 85% |
|  | 1,000 | 100 | >1 | 100% |

Study 4—Use of Non-Polar and Polar Oils to Remove Contaminants from Water by Destabilization Chemistry with DAF In Studies 1–3, it was shown that oils containing polar groups (ester) are removed from water much better than non-polar oils when using destabilization with DAF. In this study, the capability of polar and non-polar oils to remove contaminants from water was explored.

Two aliphatic oil types with no polar groups were used. The first was a light volatile mid-range naphtha solvent. The second was a medium-weight non-volatile petroleum oil, similar in chemical characteristics to vegetable oil. The oils were added to paper mill waste water and industrial metal fabrication wash water, then gently shaken. The contaminants in the paper mill water were mostly natural-based fats and oils. The contaminants in the metal fabrication wash water were mostly petroleum-based cleaning solvents and oils. For the mill samples, the flocculant dosage was 5 ppm of Magnifloc 1555, and no coagulant was used. For the industrial samples, the coagulant dosage was 400 ppm of aluminum sulfate and 200 ppm of sodium aluminate. The flocculent dosage was 5 ppm of Magnifloc 496. The same process was repeated where the oils were first mixed with ester in the proportion of 10 parts oil to 1 part ester, before addition to the water. All samples were then subjected to DAF. For the light oil, total petroleum hydrocarbons (TPH) were measured. For the heavy oil, fats oils and greases (FOG) were measured.

The results, disclosed in Table 4, display a dramatic increase in contaminant removal, and partition coefficient when ester is added to the oils. For the Mill waste and light oiL the partition coefficient is almost ten times higher. For the heavy oil, the partition coefficient is almost fifty times higher. Similar values were obtained for the industrial water.

Several conclusions can be drawn from the exceptionally high partition coefficients. Firstly, partition coefficients quoted in the literature for conventional solvent extraction are generally in the range of tens to hundreds. Those measured in this experiment are much higher, even for the straight oils. This provides strong evidence that the droplet mechanism used in this invention can reach much higher partition coefficients than conventional solvent extraction systems. When the ester is added to the oils, partition coefficients go up into the millions, which is unheard of in conventional solvent-extraction practice. This provides strong evidence that the polar groups in the oil specifically significantly increase the amount of contaminant that associates with the oil droplets.

TABLE 4

Comparison of Use of Non-Polar and Polar Oils to Remove
Contaminants from Water by Destabilization Chemistry with DAF

| Water type | Oil Type | Oil added ppm | ester added ppm | FOG/TPH initial ppm | FOG/TPH final ppm | % FOG/TPH removed | Partition Co-efficient |
|---|---|---|---|---|---|---|---|
| Mill | Light | 100 | 0 | 33.3 | 26 | 23% | 2,910 |
|  | Heavy | 100 | 0 | 74 | 65 | 12% | 1,380 |
|  | Light | 100 | 10 | 33.3 | 10 | 70% | 21,200 |
|  | Heavy | 100 | 10 | 74 | 9 | 88% | 65,700 |
| Industrial | Light | 100 | 0 | 1430 | 144 | 90% | 89,300 |
|  | Heavy | 100 | 0 | 548 | 65 | 88% | 74,300 |
|  | Light | 100 | 10 | 1430 | 7 | 100% | 1,990,000 |
|  | Heavy | 100 | 10 | 548 | 1 | 100% | 4,960,000 |

Study 5—Removal of Petroleum Contaminants from Groundwater

Table 5 discloses the results of tests performed using ester, destabilization chemistry and DAF to remove the remains of a fuel oil spill from ground water. The spill was near the seashore, and experienced influx and outflux of seawater. The fuel oil had probably lost most of its volatiles leaving only heavy oils behind. The petroleum was fully dissolved in the water, and the water appeared clear. The samples were coagulated with 250 ppm of Altafloc, and flocculated with 5 ppm of Magnifloc 496C.

The results are shown as a function of increasing amounts of ester used to remove the contaminants. Use of destabilization chemistry and DAF alone removed 46% of the contaminants. This is typical of levels of petroleum contaminant removal achievable with destabilization chemistry in general waste water treatment applications. Adding ester enhanced the contaminant removal capability, lowering remaining contaminant levels down to below 5 ppm, which is an EPA limit for discharge of waste water to the environment. Levels of the ester and contaminants in the water were determined by measuring FOG.

TABLE 5

Comparison of Removal of Petroleum Contaminants from Groundwater

| Con-taminant initial ppm | Ester ppm | Con-taminant final ppm | Contaminant Removed | Partition Coefficient | Ratio of Ester to Contaminant |
|---|---|---|---|---|---|
| 72.5 | 0 | 38.8 | 46% | | |
| 72.5 | 10 | 15.8 | 78% | 359,000 | 0.14 |
| 72.5 | 100 | 6.1 | 92% | 109,000 | 1.38 |
| 72.5 | 1,000 | 2.4 | 97% | 29,200 | 13.79 |

The partition coefficient again is much higher than found in conventional solvent extraction processes. However, it dropped off as increased levels of ester were added to the water, indicating less affinity of the contaminant for the ester with increasing levels of ester.

It is believed that the cause of this drop in partition coefficient is due to a water-in-oil emulsion being formed within the ester droplets, when the ratio of ester to contaminant is high. As the ester has a low HLB, it forms water-in-oil emulsions when mixed with water. When there is a high level of contaminant present, it is believed that it drives out the water in the ester, making the center of the ester droplets more hydrophobic, making the solvent partition coefficient higher. This implies that in this experiment a higher partition coefficient could have been maintained if a straight aliphatic oil were mixed with the ester, to lower the amount of water emulsifying in the oil, but still retain the capability to remove the oil with destabilization. Thus less ester may have been required for equivalent contaminant removal.

Study 6—Removal of Organic Contaminants from Industrial Laundry Wastewater #1

Table 6 discloses the results of tests performed using destabilization chemistry and ester to remove industrial laundry contaminants from water by DAF. The contaminants were generally petroleum-based cleaning solvents, heavy oils and greases, and printing inks, in combination with soap residuals from the cleaning process. The soap residuals were water-soluble surfactants. Even though these contaminants had gone through a hot water washing operation, a substantial quantity of volatile organic residuals remained in the water, mostly in a stable emulsion form. The coagulant dosage was 1,000 ppm of aluminum sulfate, the coagulant aid dosage was 500 ppm of Altafloc, and the flocculant dosage was 5 ppm of Magnifloc 496C. Levels of the ester and contaminants in the water were determined by measuring FOG.

The results are shown first with no ester added, then with increasing amounts of ester added. While the contaminants were substantially not soluble in water, only 57% could be removed with destabilization chemistry alone. Adding only 10 ppm of ester to the water allowed substantial removal of the contaminant, producing a partition coefficient in the hundred million range. The ester may have assisted the contaminant removal in several different ways. For example, it may have countered the effect of the residual water-soluble surfactants (soaps) allowing coagulation to take place. It may have provided a sufficient number of polar groups to the contaminant to allow the flocculant to work more effectively, or it may have added sufficient hydrophobicity to the contaminants to allow the DAF bubbles to more easily attach to them for increased removal. Addition of 100 ppm of ester to the water did not result in as good removal as 10 ppm of ester. It is believed that the amount of ester present in the water became too high to be adequately removed by the levels of chemistry used in these experiments.

TABLE 6

Comparison of Removal of Organic Contaminants from Industrial Laundry Wastewater #1

| Contam initial ppm | Ester ppm | Contam final ppm | Contam Removed | Coll. Part. Coefficient |
|---|---|---|---|---|
| 1630 | 0 | 700 | 57% | |
| 1630 | 10 | >1 | 100% | 163,000,000 |
| 1630 | 50 | >1 | 100% | 32,600,000 |
| 1630 | 100 | 17 | 99% | 949,000 |

Study 7—Removal of Organic Contaminants from Industrial Laundry Wastewater #2

Table 7 discloses the results of tests performed using destabilization chemistry and ester to remove contaminants from a second sample of Industrial Laundry Waste Water. The laundry used a similar washing process, as that in Study 6, but used different soap chemistries. The initial coagulant dosage was 600 ppm of aluminum sulfate, the initial coagulant aid dosage was 300 ppm of Altafloc, and the initial flocculant dosage was 53.5 ppm of Magnifloc 496C. Levels of the ester and contaminants in the water were determined by measuring FOG.

The test protocol first increased the amount of ester added to the waste water while holding the amount of destabilzation chemistry added constant. Then the amount of destabilization chemistry was increased while holding the amount of ester added constant. In the first set of experiments the addition of low amounts of ester resulted in an initial increase in the amount of residual contaminants remaining in the water after treatment. When the amount of ester reached a sufficient level, the amount of residual contaminant began to decrease. This break point may have been the result of remaining water soluble surfactants (soaps) in the water. At low levels of ester addition, these surfactants may have co-dissolved with the ester, possibly interfering with the capability of the ester to promote removal of the contaminants. When sufficient ester was added, the surfactant-ester combination may have finally become insoluble enough or polar enough to be acted upon by the destabilization chemistry.

In the second set of experiments it was demonstrated that the amount of contaminant removed increases up to a point with amount of coagulation chemistry added. However, a limit is reached where larger doses of chemistry do not increase contaminant removal.

TABLE 7

Comparison of Removal of Organic Contaminants from Industrial Laundry Wastewater #2

| Percent of initial Destabilization Chemistry | Contam initial ppm | Ester ppm | Contam. Final Ppm | Contam Removed | Partition Coefficient |
|---|---|---|---|---|---|
| 100% | 2497 | 0 | 625 | 75% | |
| 100% | 2497 | 30 | 842 | 66% | 65,500 |
| 100% | 2497 | 40 | 438 | 82% | 118,000 |
| 100% | 2497 | 50 | 17 | 99% | 2,920,000 |
| 20% | 2497 | 50 | 867 | 65% | 37,600 |
| 50% | 2497 | 50 | 771 | 69% | 44,800 |
| 75% | 2497 | 50 | 575 | 77% | 66,900 |
| 100% | 2497 | 50 | 17 | 99% | 2,920,000 |
| 200% | 2497 | 50 | 17 | 99% | 2,920,000 |

Study 8—Removal of Trihalomethanes, Color and Turbidity from Drinking Water

Table 8 discloses the results of tests performed using destabilization chemistry and ester to remove contaminants from potable water. Potable water treatment is usually performed by addition of alum, followed by gravity settling, mechanical filtration, or treatment with dissolved air flotation. One significant contaminant group tested was trihalomethanes (THMs) formed by the reaction of chlorine added to the water on dissolved organic contaminants present in the water. THMs are known carcinogens, and their levels in drinking water are regulated to be below 100 parts per billion (ppb) by the USEPA. Examples of THMs are methylene chloride, methyl chloride, methyl bromide, bromodichloromethane, bromoform, chlorodibromomethane, and chloroform. Another type of contaminant tested was Apparent Color, measured in PCU units, which is often a result of tannic, humic and fulvic acids present in the water, which form as a result of the breakdown of soils and vegetation. A third contaminant tested was turbidity, measured in NTU units, which is colloidal material that may be a combination of organic and mineral material.

The water used in the first set of experiments was raw potable water drawn from the eastern Lenox Mountain reservoir in Lenox, Mass. The coagulant dosage was 100 ppm of Altafloc. The flocculant dosage was one ppm of Percol LT22S. Removal of the ester-contaminant mixture was by DAF. The addition of flocculant without ester resulted in an increase in THM's, because the flocculant itself is an organic contaminant not fully removed by DAY. An increase in THM's as a result of flocculant addition in municipal drinking water treatment plants is a well known phenomenon. Flocculant is added to reduce turbidity and color. In most cases a balance must be sought between the level of turbidity and color removed versus the increase in THM's that can be afforded by dosing with a flocculant.

However, addition of ester with the flocculant caused a reduction rather than increase in THM's. One ppm of ester reduced the THM's to below 2 ppb, and 5 ppm of ester reduced the THM's to below 1 ppb.

The water used in the second set of experiments was raw potable water drawn from the Merrnmac River water inlet to the Lawrence, Mass. Potable Water Treatment plant. The coagulant dosage was 30 ppm of aluminum sulfate, and no flocculant was used. Physical filtration through a bed of granular activated carbon (GAC) was used to remove the ester-contaminant combination from the treated water. These treatment methods were chosen to simulate water treatment procedures used at most potable water treatment facilities. Coagulation and GAC filtration alone achieved a THM removal level of 31%. Addition of one ppm of ester resulted in THM removal of only 17%. However, addition of 5 and 10 ppm of ester increased the THM removal levels over the initial treatment to 39% and 45% respectively.

Two things worked against the ester being as effective as with DAF. First, no flocculant was used to agglomerate the ester droplets. Second, GAC was used to remove the ester, rather than DAF. Therefore, microscopic ester droplets may not have become agglomerated into larger droplets, and those small droplets could have slipped through the GAC filter without being trapped.

TABLE 8

Comparison of Removal of Trihalomethanes, Color and Turbidity from Drinking Water

| Removal Method | Contam. Type | Contam. Initial ppm | Ester ppm | Contam. final ppm | Contam. Removed | Partition Coefficient |
|---|---|---|---|---|---|---|
| Dissolved Air Flotation | THMs | 0.0897 | 0 | 0.099 | −10% | |
| | | 0.0897 | 1 | 0.0019 | 98% | 46,200,000 |
| | | 0.0897 | 5 | 0.0008 | 99% | 22,200,000 |
| GAC Filtration | THMs | 0.0489 | 0 | 0.0336 | 31% | |
| | | 0.0489 | 1 | 0.0407 | 17% | 201,000 |
| | | 0.0489 | 5 | 0.0298 | 39% | 128,000 |
| | | 0.0489 | 10 | 0.027 | 45% | 81,100 |
| | Turbidity (NTU) | 1.6 | 0 | 1.7 | −6% | |
| | | 1.6 | 1 | 0.3 | 81% | 4,330,000 |
| | | 1.6 | 5 | 0.3 | 81% | 832,000 |
| | | 1.6 | 10 | 0.3 | 81% | 433,000 |
| | Color (PCU) | 31 | 0 | 20 | 35% | |
| | | 31 | 1 | 6 | 81% | 4,170,000 |
| | | 31 | 5 | 7 | 77% | 686,000 |
| | | 31 | 10 | 4 | 87% | 675,000 |

The ability of coagulation and filtration in combination with the ester to remove color and turbidity from the potable water samples was also tested. Both of these were reduced by 81% by the addition of one ppm of ester. This outperformed the ability of the GAC to remove these contaminants by a substantial margin. The Environmental Protection Agency guideline for color in drinking water is not more than 5 PCU. The water treatment without use of ester only reduced color to 20 PCU, while with ester it was reduced to 6 PCU. The Environmental Protection Agency strictly enforced guideline for turbidity is 0.5 NTU. The water treatment without use of ester actually increased turbidity from 1.6 to 1.7 NTU. Use of 1 ppm of ester reduced turbidity to 0.3 NTU, well under the federally mandated guideline.

Currently when Potable Water Treatment Plants are above federal limits for THMs in their treated water, they must resort to costly pre and post treatment options. These steps can be costly, requiring potential addition of new contact basins, new hazardous chemicals, such as ozone, and additional process and monitoring equipment. An alternative method for lowering THMs in the treated water, suggested by the results of these experiments, is to use, for example, methyl ester, as part of the chemical treatment package.

What is claimed is:

1. A method for removing a contaminant from water, comprising the steps of:
   a) adding droplets of a substantially non-water-soluble oil to water, the water including at least one contaminant selected from the group consisting of a dissolved contaminant, a non-polar contaminant, and a contaminant with a hydrophilic surface, the oil and water forming a mixture and the oil combining with the at least one contaminant, wherein the contaminant is effectively insoluble in the water after combining with the oil;

b) adding a coagulant to the water to further form a mixture in which the coagulant aggregates the oil droplets and said contaminant; and c) separating the oil droplets from the water, thereby removing the contaminant.

2. The method of claim 1 wherein the oil droplets are separated by a means selcted from the group consisting of filtration, gravity settling and air flotation.

3. The method of claim 1 wherein the coagulant is selected from the group consisting of aluminum sulfate, aluminum silicate, sodium aluminate, ferric chloride, bentonite clay, montmorillonite clay, kaolinite clay, and carboxymethyl cellulose.

4. The method of claim 1 wherein oil is formed from a natural oil.

5. The method of claim 1 wherein the oil includes a methyl ester.

6. The method of claim 1 wherein the oil includes a aliphatic polar C16–18 methyl ester.

7. The method of claim 1 wherein the amount of oil added to the water includes less than one percent of the volume of the water.

8. The method of claim 1 wherein the amount of oil added to the water includes about the same volume as the volume of the contaminant in the water.

9. The method of claim 1 wherein the oil forms droplets that are less than about 0.1 millimeters in average diameter after mixing with the water.

10. The method of claim 1 wherein the contaminant includes organic substances which lead to formation of trihalomethanes in chlorinated water.

11. The method of claim 1 wherein the contaminant is included in the group consisting of methylene chloride, methyl chloride, methyl bromide, bromoform and dichlorobromomethane.

12. The method of claim 1 wherein the contaminant is dissolved or suspended.

13. The method of claim 1 wherein the contaminant includes at least one of the following: TPH, FOG, BOD, and COD.

14. The method of claim 1 wherein the contaminant causes turbidity.

15. The method of claim 1 wherein the contaminant adds color to the water.

16. The method of claim 1 wherein the contaminant includes biologically active material.

17. The method of claim 1 wherein the contaminant is selected from a group consisting of bacterial material, viral material, DNA and RNA.

18. The method of claim 1, wherein the oil includes polar functional groups.

19. The method of claim 1, wherein the water includes a dissolved contaminant that combines with or is captured by the oil.

20. The method of claim 1, wherein the water includes a non-polar contaminant that combines with or is captured by the oil.

21. The method of claim 1, wherein the water includes a contaminant with a hydrophilic surface that combines with or is captured by the oil.

22. The method of claim 1, wherein the oil includes ionic functional groups.

23. The method of claim 22, wherein the oil further includes non-ionic functional polar groups.

24. The method of claim 1, wherein the oil has an HLB value in the range of between about one and ten.

25. The method of claim 1, wherein the oil has an HLB value in the range of between about one and six.

26. The method of claim 1, further comprising the step of adding a flocculant to the water.

27. The method of claim 1, further comprising the step of utilizing the water as drinking water after the oil droplets are separated from the water.

28. The method of claim 1, further comprising the step of chlorinating the water.

29. A method for removing a contaminant from water, said contaminant selected from the group consisting of a dissolved contaminant, a non-polar contaminant, and a contaminant with a hydrophile surface, comprising the steps of:

a) adding droplets of a substantially non-water-soluble oil to contaminated water, the oil and water forming a mixture and the oil combining with the contaminant in the contaminated water, the oil further including an aliphatic polar C16–18 methyl ester, wherein the contaminant is effectively insoluble in the water after combining with the oil;

b) adding a chemical destabilizer to the water to further form a mixture to aggregate the oil droplets and said contaminant; and c) separating the oil droplets from the water, removing the contaminants.

30. The method of claim 29, wherein the chemical destabilizer includes a coagulant.

* * * * *